UNITED STATES PATENT OFFICE.

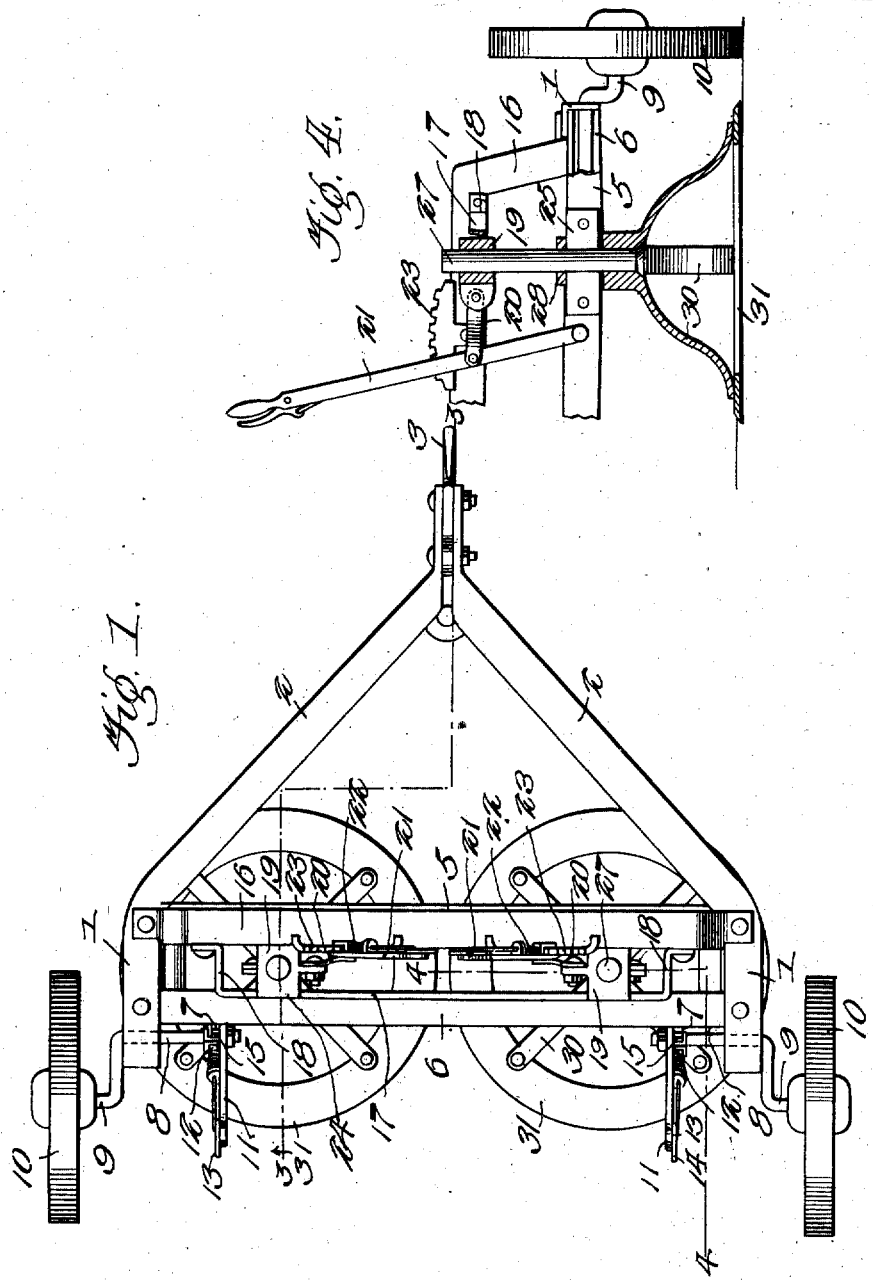

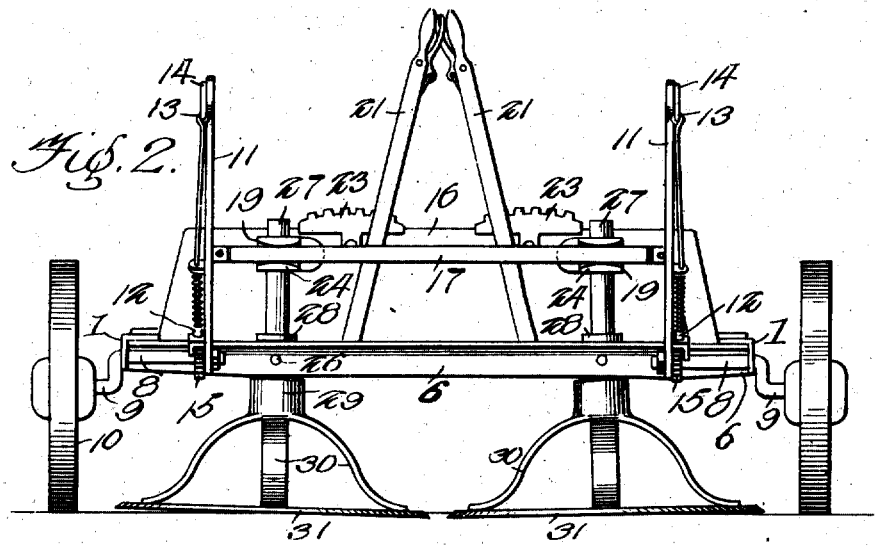

NEWTON J. VANSKIKE AND GEORGE H. EBERT, OF PRESCOTT, WASHINGTON.

WEEDER.

987,512.     Specification of Letters Patent.     Patented Mar. 21, 1911.

Application filed December 7, 1910. Serial No. 596,092.

*To all whom it may concern:*

Be it known that we, NEWTON J. VANSKIKE and GEORGE H. EBERT, citizens of the United States of America, residing at Prescott, in the county of Walla Walla and State of Washington, have invented new and useful Improvements in Weeders, of which the following is a specification.

This invention relates to devices for destroying weeds, and it has for its object to produce a simple and efficient machine whereby weeds may be cut or trimmed closely to the ground or below the surface of the ground, if preferred, to insure their speedy extermination.

A further object of the invention is to provide simple and efficient means whereby the cutting apparatus may be adjusted so as to cut or sever the weeds or plants at the desired point.

A further object of the invention is to provide means whereby the cutting members, which consist of revolving knives, may be tilted to various angles.

Further objects of the invention are to simplify and improve the general construction and operation of a machine of the character described.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a weed cutting machine constructed in accordance with the invention. Fig. 2 is a rear elevation of the same. Fig. 3 is a longitudinal vertical sectional view taken on the line 3—3 in Fig. 1. Fig. 4 is a vertical transverse sectional view taken on the line 4—4 in Fig. 1. Fig. 5 is a perspective view, showing one of the cutting members, together with the shaft and the bearings for the same, detached from the machine.

Corresponding parts in the several figures are denoted by like characters of reference.

The frame of the improved machine includes side members 1, 1 consisting of angle bars which are made to converge forwardly, as shown at 2, 2, the forward ends of said bars being suitably connected together. A draft hook 3 is mounted at the front end of the frame, and said front end is suitably supported upon a guide wheel or caster wheel 4. The side members 1, 1 are connected together by front and rear cross bars 5 and 6, each consisting of an angle bar. Secured upon the rear cross bar 6 are the bearing members 7 for the inner ends of the crank shafts or axles 8 which extend through and have additional bearings in the rear ends of the side members 1, said crank axles being provided at their outer ends with spindles 9 carrying the transporting wheels 10. The inner ends of the axles 8 are provided with hand levers 11 having stop members 12 operable by means of bell cranks 13 having handles 14 and adapted to engage quadrants 15 formed upon the bearing members 7. It will be readily seen that by means of the hand levers 11 the wheels may be adjusted to raise and lower the two sides of the frame independently of each other.

Mounted upon the frame of the machine directly above the front cross bar 5 is an arch 16 upon the rear side of which is supported a guide bar 17 which is spaced from the top of the arch by offsets 18. Between the arch 16 and the guide bar 17 are mounted slidable blocks 19 which are connected by links 20 with hand levers 21 pivoted upon the frame of the machine, said hand levers being provided with spring actuated stop members 22 adapted to engage quadrants 23 which are mounted upon the frame. The blocks 19 are provided with flanges 24 engaging the guide bar 17, said blocks being thereby retained between the guide bar and the top portion of the arch 16.

Between the front and rear cross bars 5 and 6 are mounted pivotal boxes 25 having trunnions 26 engaging the webs of the frame bars. These boxes afford bearings for the lower ends of shafts 27, the upper ends of which are supported for rotation in the slidable blocks 19, and it will be observed that by moving said blocks 19 from one side to another the shafts 27 may be tilted to various positions, in which the said shafts may be maintained by the stop members 22 upon the hand levers 21 engaging the quadrants 23. To prevent the shafts 27 from dropping downwardly in their respective bearings said shafts are provided with collars 28 directly above the pivoted boxes 25. The lower ends of the shafts 27 are equipped with hubs 29 having downwardly divergent arcuate spokes 30 upon the lower ends of which the annular knives or cutting members 31 are riveted or otherwise secured.

From the foregoing description it will be seen that the depth of the cut may be regulated by raising or lowering the sides of the frame with reference to the supporting wheels 10, this being accomplished by rocking the crank axles 9 by means of the levers 8. The cutting members may be tilted so as to engage the ground at various inclinations by means of the hand levers 21. The inclined sides of ridges may thus be conveniently and effectively operated upon. As the machine is drawn over the ground, the cutting members will be rotated by contact with the ground, and the weeds and noxious plants will thus be cut as close to the ground as may be desired and thus destroyed.

Having thus described the invention, what is claimed as new, is:—

1. In a weed cutting machine, a frame having cross bars, boxes having trunnions pivotally engaging said cross bars, an arch rising from the frame, a guide bar supported in parallel relation to and spaced from the top of the arch, blocks slidably supported between the arch and the guide bar, means for adjusting the slidable blocks and for securing them at various adjustments, and cutter carrying shafts each supported for rotation in a pivoted box and a slidable block.

2. In a weed cutting machine, a frame having rotary supporting means, means for adjusting the latter to raise and lower the frame, bearing boxes having trunnions pivotally engaging the frame, an arch rising from the frame, a guide bar supported in parallel relation to and spaced from the top of the arch, blocks supported slidingly between the arch and the guide bar and having overhanging flanges engaging the latter, means for adjusting the blocks and for retaining them at various adjustments, shafts each supported for rotation in a pivoted box and a slidable block, hubs at the lower ends of said shafts having downwardly divergent spokes, and annular cutters secured upon the lower ends of the spokes.

In testimony whereof we affix our signatures in presence of two witnesses.

NEWTON J. VANSKIKE.
GEORGE H. EBERT.

Witnesses:
CHAS. H. O'NEIL,
BERT WHEELON.

---

Copies of this patent may be obtained for five cents each, by addressing the "Commissioner of Patents, Washington, D. C."